July 29, 1941. K. L. CURTIS Re. 21,866

METHOD OF AND APPARATUS FOR FEEDING TAPE AND PROJECTING IMAGES THEREFROM

Original Filed March 28, 1930 3 Sheets-Sheet 1

INVENTOR
Kenneth L. Curtis
BY Wood Cooley & Wood
his ATTORNEYS

July 29, 1941. K. L. CURTIS Re. 21,866

METHOD OF AND APPARATUS FOR FEEDING TAPE AND PROJECTING IMAGES THEREFROM

Original Filed March 28, 1930 3 Sheets-Sheet 2

INVENTOR
Kenneth L. Curtis
BY Wood Crosby & Seal,
Its ATTORNEYS

July 29, 1941. K. L. CURTIS Re. 21,866

METHOD OF AND APPARATUS FOR FEEDING TAPE AND PROJECTING IMAGES THEREFROM

Original Filed March 28, 1930 3 Sheets-Sheet 3

INVENTOR
Kenneth L. Curtis
BY Wood Crosby & Neal
his ATTORNEYS

Reissued July 29, 1941

Re. 21,866

UNITED STATES PATENT OFFICE 21,866

METHOD OF AND APPARATUS FOR FEEDING TAPE AND PROJECTING IMAGES THEREFROM

Kenneth L. Curtis, deceased, late of New York, N. Y., by Trans-Lux Corporation, assignee, New York, N. Y.

Original No. 2,028,146, dated January 21, 1936, Serial No. 439,570, March 28, 1930. Renewed June 20, 1934. Application for reissue February 24, 1941, Serial No. 380,334

5 Claims. (Cl. 88—24)

This invention relates to method of and apparatus for controlling movement of a tape or the like.

The embodiment of the invention shown and described herein comprises the usual form of stock ticker from which tape with quotations printed by the ticker is fed out with a jerky or pulsating motion which is changed into a relatively steady movement as the tape is being magnified by the projector in order to avoid magnifying at the same time the jerks given the tape by the ticker and thus rendering the quotations illegible.

The tape should glide across the projector shortly after its release by the ticker and this gliding is preferably accomplished by a separate take-up motor which moves the tape at about the same speed it is released from the ticker. Since the ticker is constantly starting and stopping, the take-up motor should also be ready to start and stop in such manner that the total rate of feed past the projection axis is commensurate with the total rate of feed from the ticker. It is greatly desirable that the rate of feed past the projection axis be continuous for as long a period as is possible and to this end, therefore, the rate of feed past the projection axis during such periods should vary according to the rate of intermittent feed of the ticker during the corresponding period. Likewise, it is desirable that the motor be continuously energized during this period of continuous feed, so that, with a ticker which is adapted to operate at a high rate of speed, the fluctuations between a fast market and a slow market may be handled throughout the wide range of speed, and yet the device be sufficiently sensitive not to permit an undesirable time interval between ticker feed and projection feed in a fast market.

That is, if the ticker slows up to a certain degree, the motor feeding tape past the projector will remain energized and continuously running at a speed variable in accordance with the ticker feed, whereas if the ticker stops or nearly stops the feed motor will be deenergized, the object being to keep the motor energized and in continuous operation for as long sustained periods as possible and merely varying its speed to accommodate the varying ticker feed. When the ticker stops, the motor must stop to prevent breaking the tape or damaging the ticker, and therefore the contact must also serve to immediately break the motor circuit in this event. It will be understood that the invention may advantageously be used with tickers which operate at constant speed as well as with those wherein the speed of operation is variable.

To fulfill these desirable conditions a method of operation providing a sensitive control, flexible in operation, is required. In addition the apparatus for effecting such control should operate without injury to the tape or other parts of the apparatus and it should also be simple and not apt to get out of order, but easily repaired, if repair is required. The principal objects of this invention are to provide a method whereby these desired conditions will be fulfilled and a device of the character mentioned which shall possess these desired characteristics.

Further objects of the invention will more fully appear from the following description taken in connection with the accompanying drawings illustrating by way of example the preferred embodiments of the apparatus used in carrying out the method.

In the accompanying drawings, showing by way of example the present preferred embodiments of the invention:

Figure 1:
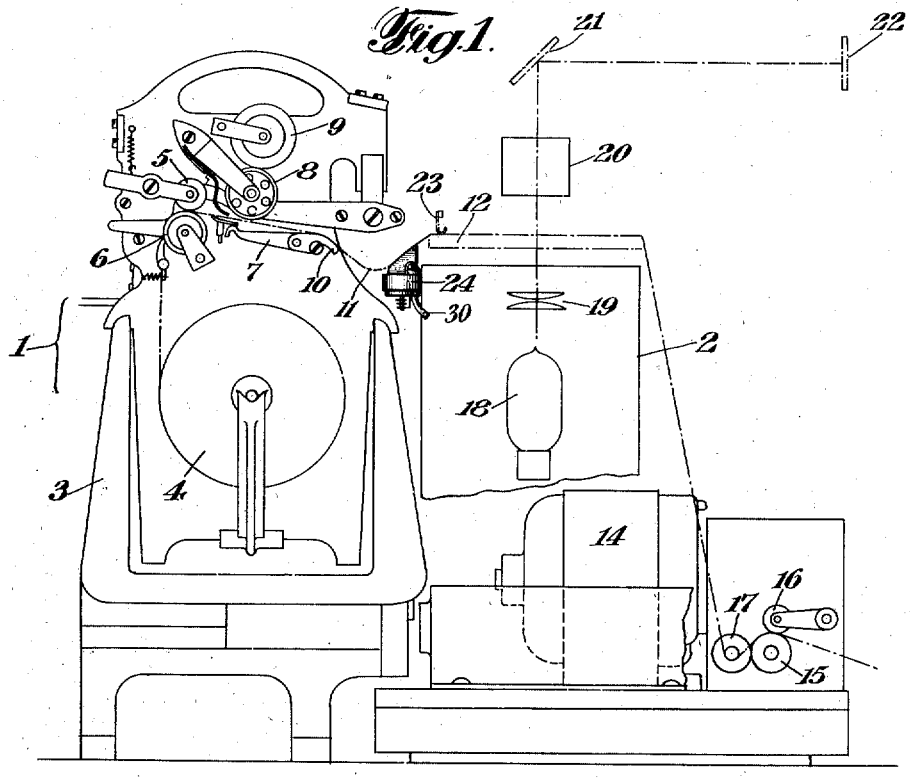
Fig. 1 is an elevation showing certain parts diagrammatically for clearness.

Referring to the drawings and particularly Fig. 1, the ticker mechanism is designated as 1 and the projecting device as 2. The ticker records printed characters—stock quotations—on tape and ejects the printed tape with a pulsating movement. The ticker here shown is the well known Western Union stock quotation ticker. The frame of the ticker is designated as 3. It supports a roll of tape 4 which may be made of transparent or translucent material for transparent projection or opaque material for opaque projection. The tape from the roll passes upwardly between feed rolls 5 and 6 from whence it passes over the platen mechanism 7 and beneath the type wheel 8, which is in contact with the ink roll 9. The type wheel 8 carries two rows of printing characters such as numerals and figures respectively and is adapted to come into cooperative position with the platen 7 to print the two sets of characters on respectively opposite edges of the tape 4. From this position the tape passes over a support 10 and is formed into a loop 11.

The loop 11 terminates adjacent the edge of the table 12 of the projector 2, across which the tape passes and then passes downwardly to a take-up device, which is operated to feed the tape 4 across the table 12. The forward end of table 12 also provides a support for the tape in its path of movement from the ticker to the projection axis; and this support is so positioned as to provide a space in the path of travel of the tape for the formation of the loop. The take-up device may be of any suitable form and in the present embodiment comprises an electric motor 14 suitably geared to and driving a wheel 15, between which and the resiliently pressed idle wheel 16 the tape is engaged to be moved in the direction as indicated. The tape is passed around the idle roll 17 to increase its peripheral engagement with the wheel 15. This take-up motor is such that if not retarded under control of the ticker feed, it will feed the tape from the loop faster than it is fed to the loop by the ticker when the ticker is running at maximum speed. The projector lamp is designated as 18 and the light therefrom is passed through a suitable lens set 19 and thence through the projector table 12 and the lens set 20 against a reflecting mirror 21, which is adapted to reflect the light through a translucent projecting surface, such as 22, arranged in a vertical plane.

A suitable means, such as the J spring 23, engages the tape adjacent the end of the projector table 12 contiguous to the loop 11 and is adapted to create sufficient friction to entirely absorb any pulsations produced by the ticker that may not have been absorbed by the loop and suction means hereinafter described, so as to eliminate such pulsations at the projection axis.

A control means for varying the operation of the motor 14, and for starting and stopping the same will now be described, with particular reference to Figs. 2, 3, 4 and 5. A fixed suction head designated in general as 24 is suitably secured between the ticker 1 and the projector 2 adjacent the projector table 12, and in the path of movement of the tape loop 11. This suction head carries integral therewith an orifice or mouth 25, elongated in the direction of movement of the tape, and whose adjacent surface is so formed and positioned as to permit the tape of the loop 11 to lie over the mouth and close it to a more or less degree depending upon the extent of the loop. The mouth 25 communicates with a valve chamber 26 (Fig. 4) through the passage 27. A movable valve member, in the present embodiment a piston 28, preferably of light weight and easily actuated by a small suction head, is in cooperative association with the chamber 27, such as by being slidably positioned in the chamber 27. A passage 29 also communicates with the chamber 26 through the passage 27, and the passage 29 communicates with one end of a tube 30 (Fig. 2), the other end of which communicates with a suction device 31 which is operated by a motor 32. Accordingly when the mouth 25 is restricted by the tape 11 to a more or less degree, suction through 29 will create a condition of suction in the chamber 26 directly in accordance with the said restriction, which will raise the piston 28 a corresponding extent.

Figure 4:
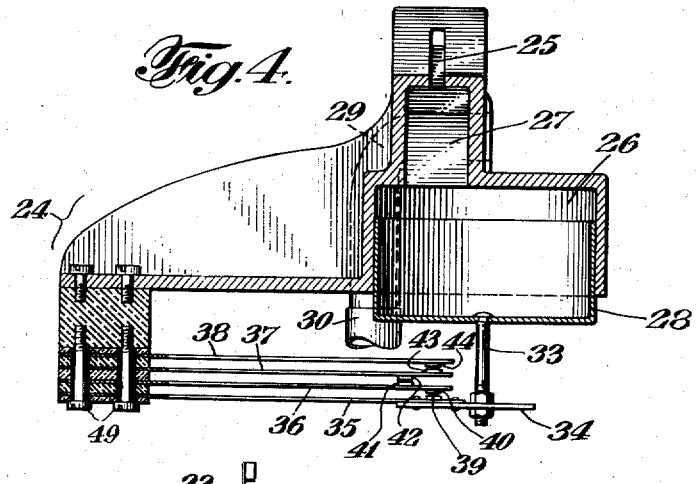
Fig. 4 is a cross-section on the line 4—4 of Fig. 3.

The piston 28 is provided with a depending rod 33 whose lower end is adjustably secured to an insulating strip 34 integral with and forming an extension of a spring steel strip 35, and together therewith providing a resilient arm whose other end is attached to the body of the suction head 24. A second resilient arm 36 of spring steel is similarly supported, and likewise additional similar resilient arms 37 and 38, each and all of said arms being supported from the body of suction head 24 and insulated therefrom and from each other. The respective pairs of arms 35—36, 36—37 and 37—38 are provided with aligned pairs of contacts 39—40, 41—42 and 43—44, which in their normal position as shown in Fig. 4, are separated. In the present illustration the respective contact arms 35, 36, 37 and 38 are electrically attached to binding posts or screws 45, 46, 47 and 48, carried by brass strips to which are attached also the contact arms, the brass strips being clamped together in insulated relation and supported by means of the insulating blocks attached to the head 24 by means of the machine screw 49.

Figure 2:
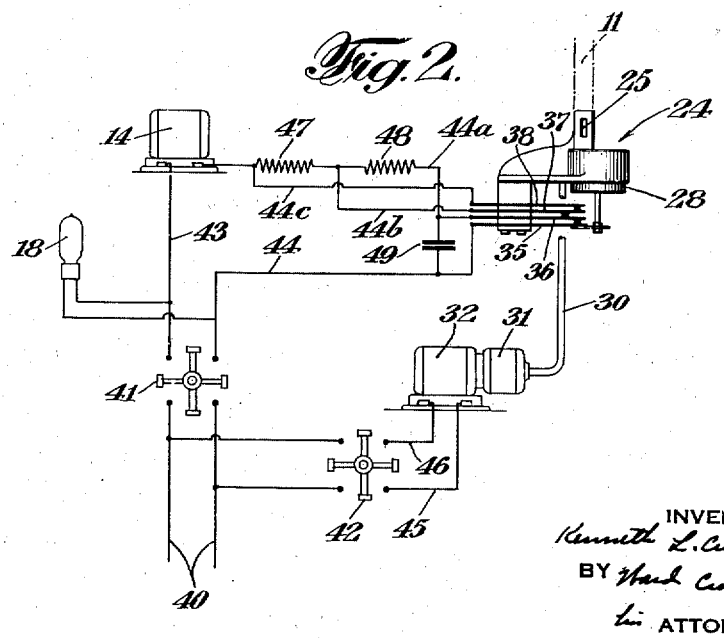
Fig. 2 is a diagrammatic view of certain parts of the apparatus other than the ticker.
Figure 3:
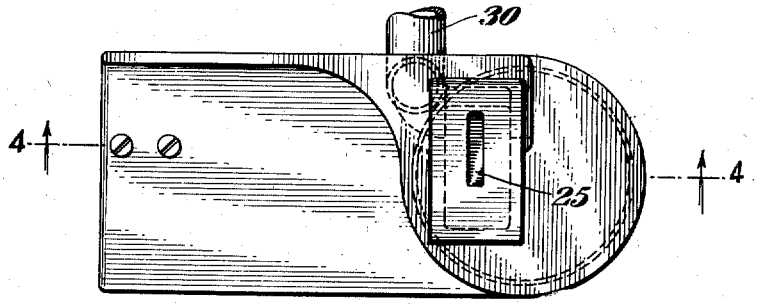
Fig. 3 is a plan view of the suction head.

Referring now to Fig. 2, it will be seen that the power circuits for the light 18, feed motor 14, and suction motor 32 are adapted to be connected with the power line 40, by means of suitable switches 41 and 42. One branch of the circuit to the motor 14 is designated as 43 and the other as 44, while the circuits to the motor 32 are designated as 45 and 46. Variable resistance is provided in the motor circuit and in the present embodiment takes the form of individual resistances 47 and 48, which are shown as inserted in the line 44. The line 44 is connected to contact arm 35, contact 36 is connected to 44*a*, contact 37 to 44*b*, and contact 38 to 44*c*; one of the pairs of contacts and associated arms and one of the branch lines 44*a*, 44*b* or 44*c*, always being in the branch line 44 when the corresponding pair of contacts is closed and the motor is in operation. When 44*a* is in circuit both resistances 47 and 48 are in circuit, when 44*b* is in circuit the resistance 47 only is in circuit, and when 44*c* is in circuit the resistances are both shunted out. A condenser 49 preferably is placed across the first pair of contacts to prevent arcing.

Figure 5:
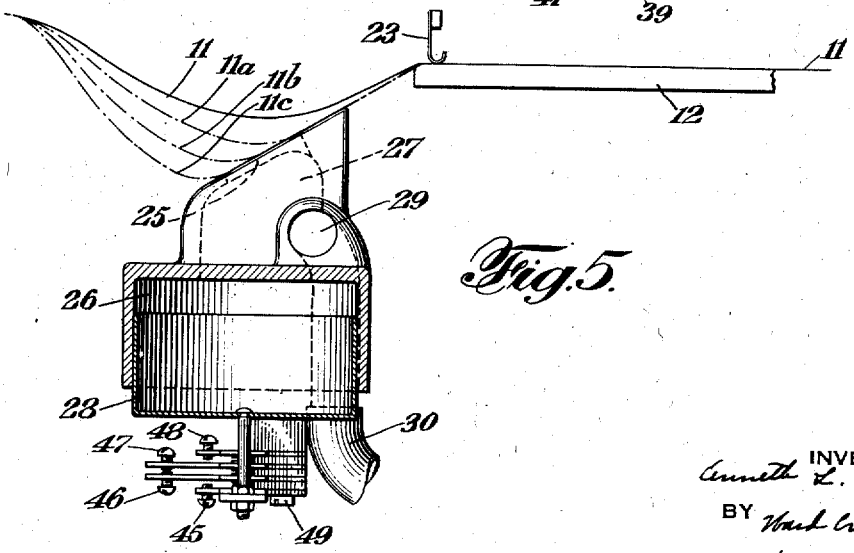
Fig. 5 is an end elevation, partly in section, and showing tape positions with respect to the suction head.

It will therefore be seen that as loop of tape varies in extent, as indicated by the nested curves of loop 11 in Fig. 5, due to the variable ticker ejection, the mouth 25 will be proportionately restricted, the suction proportionately increased in the valve chamber, the valve member proportionately raised or lowered, and the pairs of contacts proportionately closed or opened; to thereby proportionately vary the speed of the motor by varying the resistance. The loop 11 (Fig. 5) as designated in its full line position, is free of any restricting influence on the control. In the dotted position 11*a* it has just commenced to restrict the mouth 25 and has caused the contacts 39—40 to close and hence has energized the motor which will therefore operate at low speed in view of the two resistances 47 and 48. In position 11*b* the first resistance 48 has been cut out and the motor 14 therefore will be speeded up; while at 47 both resistances have been cut out and the motor therefore will run at highest speed.

*Operation*

When it is desired to operate the device the ticker 1 is started and the switches 41 and 42 are closed. The motor 32 operates the pump 31 to create suction in the line 30 which communicates through the passage 27 and through the mouth 25 to atmosphere. The tape at this time is approaching the mouth 25 due to the ticker ejection, but has not yet started to restrict the mouth; and accordingly the contacts 39 and 40 are open, thereby opening the line 44 in circuit with the motor 14. As the tape is ejected the loop extends down to the position indicated as 11*a* (Fig. 5) and there commences to restrict the mouth 25, the tape passing on over the suction head 24 to the projecting table 12 against which it is resiliently held by the J spring 23. From the table 12 the tape passes on to the take-up rolls 15, 16, 17, from where it may be taken up on a wind up reel (not shown). With the tape loop 11 in the position shown at 11*a*, the mouth 25 is sufficiently restricted to create increased suction in the valve chamber 26 to thereby slightly raise the valve member or piston 28. This in turn bends the contact arm 35 upwardly, thereby causing the contacts 39, 40 to come into engagement and to complete the electrical circuit from motor 14. Since this circuit includes the resistances 47, 48, the motor 14 will commence running at its low speed. As the ticker ejects tape at a faster rate, so as to cause the loop to form such as 11*b*, the mouth is further restricted and the suction increased to cause the valve member 28 to be lifted still further, thereby bending upwardly the contact arms 35 and 36 and causing the contact points 41 and 42 also to come into engagement, thereby shunting the circuit over 44*b* and cutting out the first resistances 48 and therefore resulting in speeding up the motor. On further increasing the rate of ticker feed, the tape loop forms as 11*c*, to entirely or substantially entirely close the mouth 25, thereby again increasing the sucton to further raise the piston 28, with the result that the contact arms 35, 36 and 37 are bent upwardly to cause the contacts 43 and 44 to come into engagement and shunt the motor circuit over the line 44*c* and thereby cut out both of the resistances 47 and 48 and hence cause the motor to run at its fastest speed. Conversely, when the rate of ticker ejection is slowed up, the motor will be slowed up, it being understood that the chief object is to keep the feed motor 14 energized and operating through as long periods as possible, and to vary the take up feed throughout such periods, in accordance with the varying feed of the tape from the ticker. This is very desirable, particularly in view of the high speed tickers now utilized. When the loop 11 opens or substantially opens the mouth 25, the suction head is vented to the atmosphere and accordingly the piston 28 moves to its lower position, entirely opening the circuit to motor 14 and causing the motor to cease operation.

*Modification*

In Figs. 6, 7, 8 and 9 there is illustrated a modified form of the invention in which a modified form of suction head and valve-operating mechanism is shown. The diagrammatic showing in Fig. 6 includes other parts of the apparatus similar in all respects to those shown in Fig. 2, and for purposes of simplifying the understanding of the modifications the corresponding parts of Figs. 2 and 6 bear the same numerals, but in Fig. 6 the suffix prime (′) has been added.

Figure 6:
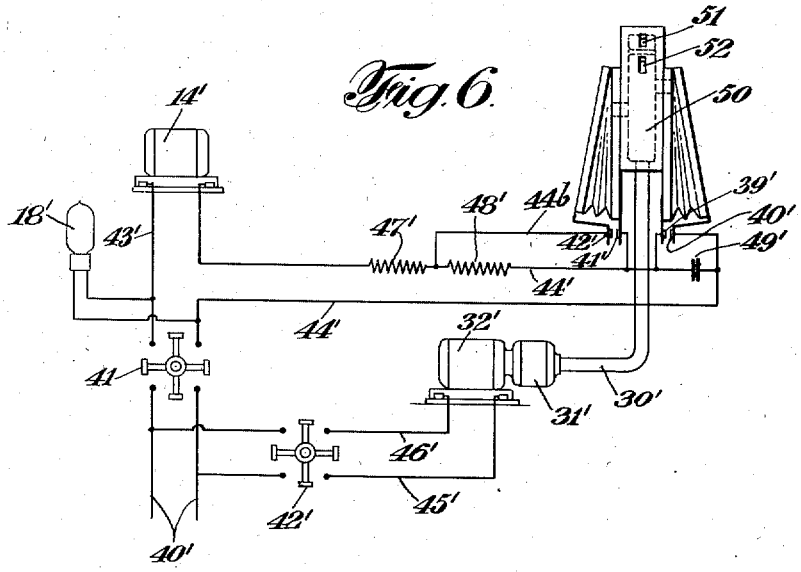
Fig. 6 is a diagrammatic view showing a modification of the apparatus shown in Fig. 2.
Figure 7:
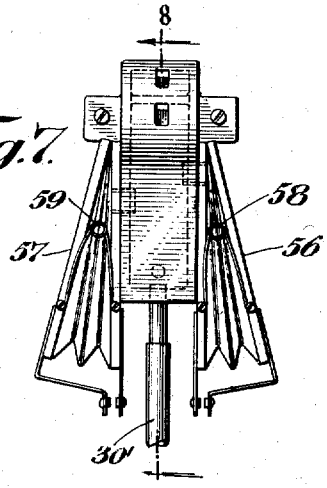
Fig. 7 is a front elevation of a modified suction head.
Figure 8:
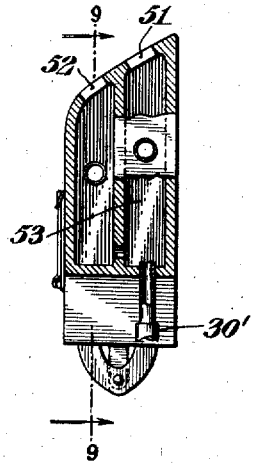
Fig. 8 is a section taken on the line 8—8 of Fig. 7.
Figure 9:
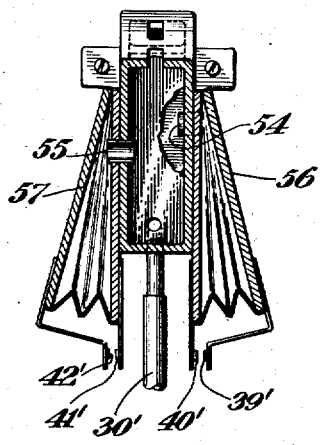
Fig. 9 is a section taken on the line 9—9 of Fig. 8.

In Fig. 6 the modified suction head is designated as 50, and in place of the single mouth heretofore described, the two mouths 51 and 52 are provided, being slightly separated in the longitudinal direction of movement of the ticker tape. Referring more particularly to Figs. 7, 8 and 9, the suction head comprises a chamber 53 which communicates through ports 54, 55, with two simple bellows valves 56, 57, the bellows 56 communicating with the mouth 51 and the bellows 57 communicating with the downwardly spaced mouth 52. The bellows 56 is provided with contacts 39′, 40′ which are normally open but are adapted to be closed when the bellows is collapsed, and the bellows 57 is provided with contacts 41′, 42′ which are normally open but are adapted to be closed when the bellows is collapsed. The springs 58 and 59 serve to normally hold the bellows open. In the present embodiment of the modification only two sets of contacts are used, and accordingly only two steps of speed are provided for the motor 14′, as will be clearly seen from Fig. 6.

The operation of the device is quite similar to that heretofore described, with the exception that the loop 11 first acts to restrict or entirely close the mouth 51 which increases the suction in the bellows 56, causing it to collapse and close the contacts 39′, 40′ to thereby close the motor circuit over the line 44*a*′ through the two resistances 47′, 48′, to thereby operate the motor at lowest speed. When the loop extends further downwardly the mouth 52 is restricted or closed to thereby close the contacts 41, 42 in a similar manner and hence to shunt the motor circuit over the line 44*b*′ to cut out the resistances 48′ and hence speed up the motor. Conversely, the motor is slowed down as the tape uncovers the mouth 52 and is entirely stopped when the tape moves away from the mouth 51.

Having thus described the invention with particularity with reference to its preferred forms, it will be obvious to those skilled in the art, after understanding the invention, that various other changes and modifications may be made therein without departing from the spirit and scope of the invention, and it is aimed in the appended claims to cover all such changes and modifications as are within the scope of the invention.

What is claimed as new and desired to be secured by Letters Patent, is:

1. The method of feeding a character-bearing tape, which comprises creating a condition of suction adjacent a loop of said tape, causing said suction to be altered by said loop, and operating an electric motor at a non-uniform rate of speed in accordance with alteration in said suction condition, whereby while the motor is continuously feeding said tape the speed of feed is varied by and in accordance with the movement of the tape.

2. In a device of the character described, the combination of a suction head having a mouth over which the tape passes, said mouth communicating with a valve chamber, a valve in said valve chamber and operated by suction in said chamber, means for creating suction in said chamber, and a plurality of electrical contacts with means whereby respective contacts may be progressively closed by the operation of said valve.

3. In a device of the character described, the combination of a suction head having a mouth over which the tape passes, said mouth communicating with an integral valve chamber, a valve in said valve chamber and operated by suction in said chamber, means for creating suction in said chamber, a plurality of electrical contacts, and means operated by said valve for progressively closing said contacts whereby respective contacts may be progressively closed by the operation of said valve.

4. In a device of the character described, the combination of a suction head having a mouth over which the tape passes, said mouth communicating with a valve chamber, a valve in said valve chamber and operated by suction in said chamber, means for creating suction in said chamber, a flexible contact arm operatively connected to said valve to be deflected by the operation thereof and carrying a first contact, and a plurality of cooperating flexible contact arms carrying cooperating contacts, said contacts and arms being so arranged that upon operation of said valve respective pairs of contacts will be closed progerssively.

5. In a projection system, the combination with a projection field toward which a character-bearing tape is fed at a non-uniform rate, of a motor for pulling said tape through said field, and means controlled by change in configuration of a tape loop at the entrance to said projection field for operating said motor at different rates of speed, said means comprising a suction port adapted to be more or less covered by an adjacent section of the tape loop.

TRANS-LUX CORPORATION,
*Assignee of Kenneth L. Curtis, Deceased.*
By ARTHUR C. PAYNE,
*Vice-President.*